Nov. 26, 1940.  A. C. GRANT ET AL  2,223,283
TEMPERATURE CONTROL SYSTEM
Filed Aug. 27, 1937
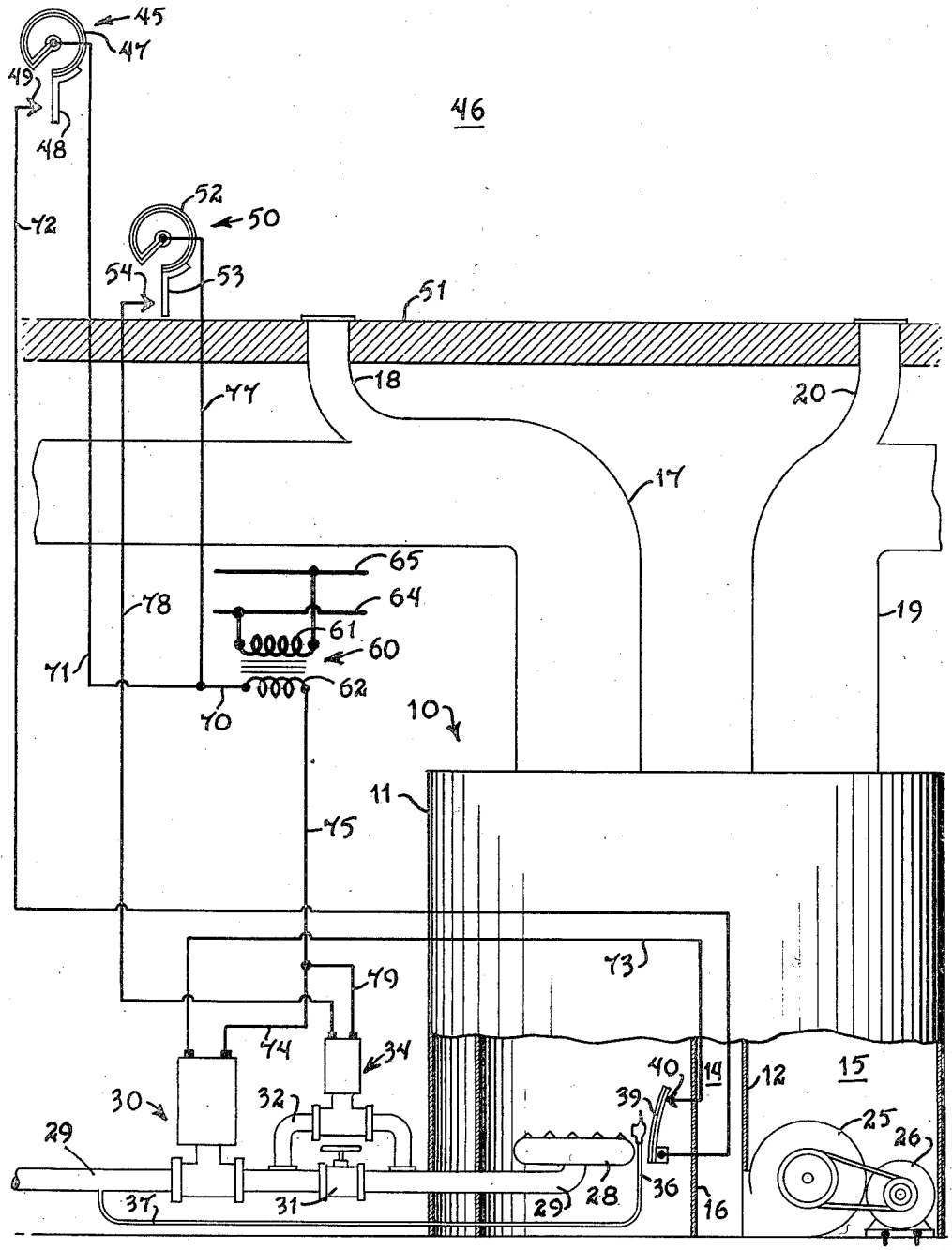
INVENTORS
Arthur C. Grant
Clarence W. Nessell
BY George H Fisher
ATTORNEY Patented Nov. 26, 1940

2,223,283

UNITED STATES PATENT OFFICE 2,223,283

TEMPERATURE CONTROL SYSTEM

Arthur C. Grant, St. Paul, Minn., and Clarence W. Nessell, Dayton, Ohio, assignors to Minneapolis-Honeywell Regulator Company, Minneapolis, Minn., a corporation of Delaware Application August 27, 1937, Serial No. 161,266

10 Claims. (Cl. 236—91)

The invention relates to a temperature control system and more particularly to one in which heat is supplied to a controlled region at varying rates.

It has been proposed in the temperature control art to supply heat at varying rates. In some cases this has been accomplished by employing a fluid fuel burner and supplying fuel to the burner at a low rate when one controlling condition prevails and at a higher rate when a second controlling condition prevails. The advantage of maintaining a variable rate of flow is that the delivery of the heat tends to be more nearly continuous. It is desirable to have a relatively continuous delivery of heat to the space so as to avoid as much as possible the starting and stopping of heat flow with the attendant discomfort to the occupants of the space being heated. In the majority of cases, these prior arrangements have been unsatisfactory in that either the method of varying the rate of supply of fuel to the burner was unduly complicated or that the means for controlling the fuel controlling means was either too complicated or not truly responsive to the actual heat demand.

An object of the present invention is to provide a temperature control system in which upon a call for heat by the room thermostat, heat is normally supplied at one rate, but in which upon the temperature adjacent the floor dropping below a predetermined value, heat is supplied at a high rate.

A further object of this invention is to provide a condition control system in which a main valve controls the flow of a condition changing fluid through a restriction in accordance with the value of a condition at one level in a controlled region and in which a by-pass valve controlled by the value of the condition at a different level controls the flow of fluid through a by-pass around said restriction.

Other objects of the present invention will be apparent from a consideration of the accompanying specification, claims and drawing.

In the single figure of the drawing, our improved temperature control system is shown in schematic form.

Referring to the drawing for a more detailed understanding of the invention, a furnace assembly is generally indicated by the reference numeral 10. This assembly comprises an enclosed casing 11 divided by a partition 12 into a warm air compartment 14 and a cold or return air compartment 15. Located in the warm air compartment 14 is a furnace proper which is designated by the reference numeral 16. Also communicating with the warm air compartment 14 is a main warm air duct 17 which is provided with branch ducts 18 leading to rooms whose temperatures are to be controlled. Extending into the return air compartment 15 is a return air duct 19 which is fed by branch ducts 20 extending from rooms whose temperatures are to be controlled.

Located in the return air compartment 15 is a fan 25. This fan is driven by a motor 26. The fan when in operation serves to draw air through the return air duct 19 forcing the same over the furnace 16 and through the warm air duct 17 to the various spaces to be heated. The motor 26 and consequently the fan may be controlled in any suitable conventional manner. For example, the fan may be controlled in a manner disclosed in the reissue patent to Edgecombe, No. 15,531 of January 23, 1923.

Located within the furnace 16 is a burner 28, which for purposes of illustration has been shown as a gas burner. Gas is supplied to the burner 28 from a main supply pipe 29 leading to any suitable source of gas supply. Interposed in the line 29 is a main electrical shut-off valve 30. This valve may be of any type wherein upon energization of the valve motor, the valve is moved to open position wherein it remains until the motor is deenergized, at which time the valve is returned to closed position. Such a valve is shown in the patent to Shivers No. 1,678,202 of July 24, 1928. Also interposed in the line 29 is a manually adjustable metering valve 31. This valve 31 may be adjusted so as to permit any desired flow therethrough. Communicating with pipe 29 is a branch pipe 32 which forms a by-pass around the valve 31. Interposed in this by-pass 32 is a second electrically operated valve 34. This valve may be of the same general type as valve 30 although inasmuch as it controls only a portion of the fuel flow to the burner, it may be of considerable smaller size.

Also located in the furnace 16 is a pilot burner 36. This pilot burner is supplied by a pipe 37 which is connected to pipe 29 at a point on the inlet side of valve 30. Located adjacent to the pilot burner 36 and responsive to the temperature of the pilot burner flame is a bimetal element 39, which bimetal element is adapted to cooperate with a contact 40. When the pilot burner 36 is ignited, the bimetal element is deflected as shown in the drawing so that it is in engagement with the contact 40. The arrangement consisting of bimetallic element 39 and contact 40 constitutes a safety pilot thermostat, the function of which will be more apparent from the subsequent portion of the description.

A room thermostat 45 is located at substantially the breathing line level in space 46 whose temperature is to be controlled. The thermostat 45 may be of any conventional form being shown for purposes of illustration as comprising a bimetallic element 47 to which is secured a contact arm 48 adapted to engage a fixed contact 49. The bimetallic element is so disposed that when the temperature drops below a predetermined value, the contact arm 48 is moved into engagement with contact 49.

A second thermostat 50 is located close to the floor 51 of the space 46. This thermostat 50 also may be of any suitable type and is shown as comprising a bimetallic element 52 to which is secured a contact arm 53 adapted to engage with fixed contact 54. Bimetallic element 52 is disposed in a manner similar to the bimetallic element 47; that is, upon a drop in temperature the contact arm 53 is moved in the direction of contact 54.

A step-down transformer 60 supplies low voltage power for operation of the system. The step-down transformer comprises a line voltage primary 61 and a low voltage secondary 62. The line voltage primary 61 is connected to line wires 64 and 65 leading to any suitable source of power (not shown).

*Operation*

The main valve 30 is controlled by the thermostat 45. This thermostat, as previously stated, is located at the breathing line level, which level is the ordinary level of a normal room thermostat. Upon the temperature adjacent to the thermostat 45 falling below a predetermined value at which the thermostat is set, contact arm 48 is moved into engagement with contact 49. When this occurs, the following circuit is established to the motor of valve 30: from the left-hand terminal of secondary 62 through conductors 70 and 71, bimetallic element 47, contact arm 48, contact 49, conductor 72, bimetallic element 39, contact 40, conductor 73, the motor of valve 30, and conductors 74 and 75 to the other terminal of secondary 62. Thus, if the pilot burner is properly lit as evidenced by the closure of thermostatic element 39 against contact 40, an energizing circuit is established to the valve motor which causes valve 30 to move towards open position. The opening of valve 30 results in gas being supplied to the burner 28, which gas is ignited by the pilot burner 36.

Since the valve 34 will normally be closed, the rate of flow of the gas to the burner 28 is determined by the adjustment of the hand valve 31. This valve is so adjusted for the particular building in which the heating plant is installed that the heat supplied by burner 28 when supplied with gas through the valve 31 will normally be sufficient to adequately heat the building. It is desirable, however, to insure that the burner remain in operation as long as possible in order to have as prolonged an operation of the fan 25 as possible. As previously indicated, it is desirable to supply the heat to the room as nearly continuously as possible. By suitably adjusting the valve 31, it is possible to obtain a relatively low rate of gas flow which in all normal weather will adequately heat the building, although requiring lengthy operation of the burner.

In order, however, to obtain the lengthy operation of the burner, it is necessary to have the rate of fuel flow sufficiently low that it is impossible to furnish enough heat in extremely cold weather or when the heat demand is abnormally great for some reason or other. Accordingly, the second thermostat 50 which is responsive to the temperature adjacent the floor controls the auxiliary valve 34 to increase the rate of fuel feed to the burner when the temperature adjacent the floor becomes excessively low. If the temperature adjacent the floor does drop to the value for which it is set causing the engagement of contact arm 53 with contact 54, the following circuit is established to the motor of valve 34: from the left-hand terminal of secondary 62 through conductors 70 and 77, bimetallic element 52, contact arm 53, contact 54, conductor 78, the motor of valve 34, and conductors 79 and 75 to the other terminal of secondary 72. As soon as this circuit is established, the valve 34 is moved to open position with the result that valve 31 is by-passed permitting a flow which is equivalent to the combined capacities of valves 31 and 34.

By controlling valve 34 in accordance with the temperature adjacent the floor, it is possible to simply control the same in accordance with the heat demand. As the outdoor temperature falls, thus necessitating a greater rate of heat delivery to the enclosure, there is a tendency for the difference in temperature between different levels in the space to increase. While the forced circulation of the air by reason of the provision of the fan 25 eliminates to some extent this differential in temperature between different levels, it is impossible to entirely avoid the same without producing excessive drafts. The thermostat 50 thus is able by reason of the fact that it is responsive to the temperature adjacent the floor to indicate the effect of the outdoor temperature upon the space between heated and consequently to indicate the heat demand. Such a thermostat is far more satisfactory than a thermostat responsive to the outdoor temperature inasmuch as it is responsive to the actual conditions of the space rather than to a condition which may in the course of time affect the condition in the space.

It will be noted that not only have we provided a very effective method of determining the heat demand but also we have provided an extremely effective method of varying the rate of flow to the burner. By providing the by-pass and controlling the by-pass valve by the floor line thermostat, it is possible to increase in a very simple manner the rate of flow to the gas burner whenever the heat demand requires a greater amount of heat to be delivered by the furnace. At the same time, the placing of the main valve 30 in series with the by-pass valve 34 and controlling this valve by the breathing line thermostat 45, it is assured that the room temperature can at no time rise excessively high even though the valve 34 is open.

It will be noted that we have provided a very simple and effective temperature control system wherein two rates of heat delivery are maintained, and wherein under normal conditions the heating apparatus is operated more or less constantly at approximately an optimum rate so that there tends to be a contant flow of heat to the controlled space. While we have shown the same in connection with a temperature control system and it is in this application that the greatest advantage lies, it is to be understood that the invention is generally applicable to any condition control system. In general, while we have shown a specific embodiment of our invention, it is to be understood that this is for purposes of illustration and our invention is to be limited only by the scope of the appended claims.

We claim as our invention:

1. In a system for controlling the temperature of a space, temperature changing means employing a heating fluid, conduit means for conducting said fluid to said temperature changing means, a main valve controlling the flow of fluid through said conduit means, means responsive to the temperature at a predetermined high level in said space for controlling said main valve, means between said main valve and said temperature changing means acting to limit the flow of fluid when said main valve is open, a by-pass around said flow limiting means, a valve in said by-pass, and means responsive to the temperature adjacent a low level in said space for controlling said last named valve.

2. In a system for controlling the temperature of an enclosed region, temperature changing means comprising a fluid fuel burner, conduit means for conducting fuel to said burner, a main valve controlling the flow of fuel through said conduit means, means responsive to the temperature at a predetermined relatively high position in said medium for controlling said main valve, means between said main valve and said temperature changing means acting to limit the flow of fuel when said main valve is open, a by-pass around said flow limiting means, a valve in said by-pass, and means responsive to the temperature adjacent a relatively low position in said medium for controlling said last named valve.

3. In a control system in combination, heating means, fuel supply control means associated with said heating means, a first thermostat in a space to be heated by said heating means controlling said fuel supply means and operable to start and stop the supply of fuel, a second thermostat at a low position in said space associated with said fuel supply control means and operable to vary the fuel supply rate provided said first thermostat is calling for heat, said first thermostat operating at a preedtermined temperature irrespective of said second thermostat and said second thermostat causing additional fuel to be supplied at greater heating loads to insure that the demands of said first thermostat will be met.

4. In a control system, in combination, heating means, heating control means associated with said heating means, a first thermostat in a space to be heated by said heating means associated with said control means and operable to initiate and terminate heating, a second thermostat at a low position in said space associated with said control means and operable to vary heating provided said first thermostat is calling for heat, said first thermostat operating at a predetermined temperature irrespective of said second thermostat and said second thermostat causing increased heating in response to lower temperatures at said low position whereby the demands of said first thermostat tend to be met.

5. In a system for controlling the condition of an enclosed region, condition changing means employing a condition changing medium, first control means including a device responsive to the condition at one level in said region operative to cause said medium to be supplied to said condition changing means when the value of the condition at said level assumes a predetermined value, and a second control means responsive to the condition at a relatively lower level in said region for controlling the rate of delivery of said medium, said second control means being operatively related to said first control means in a manner whereby said first control means must be causing medium to be supplied to said condition changing means in order for said second control means to control the rate of delivery thereof.

6. In a system for controlling the condition of an enclosed region, condition changing means employing a condition changing medium, first control means including a device responsive to the condition at one level in said region operative to cause said medium to be supplied to said condition changing means when the value of the condition at said level assumes a predetermined value, and a second control means responsive to the condition at a relatively lower level in said region for controlling the rate of delivery of said medium, said second control means being operatively related to said first control means in a manner whereby said first control means must be causing medium to be supplied to said condition changing means in order for said second control means to control the rate of delivery thereof, said first control means operating at a predetermined value of said condition irrespective of said second control means, and said second control means being operable to vary the rate of delivery of said medium in a direction tending to cause the demands of said first control means to be met.

7. In a system for controlling the temperature of a space, temperature changing means employing a heating fluid, conduit means for conducting said fluid to said temperature changing means, a main valve controlling the flow of fluid through said conduit means, means in series with said main valve and between said main valve and said temperature changing means comprising a continuously open passage of limited size and a parallel passage having a valve therein, means responsive to the temperature adjacent a predetermined high position in said space for controlling one of said valves and means adjacent the floor for controlling the other of said valves.

8. In a system for controlling the temperature of a space, a gas burner, conduit means for conducting gas to said burner, a main valve controlling the flow of gas through said conduit means, means in series with said main valve and between said main valve and said burner comprising a continuously open passage of limited size and a parallel passage having a valve therein, means responsive to the temperature adjacent the breathing height in said space for controlling one of said valves and means adjacent the floor for controlling the other of said valves.

9. In a system for controlling the temperature of a space, a warm air furnace, a gas burner for heating the air passing through said furnace, duct means for delivering the heated air to said space and returning the cool air from said space to said furnace, conduit means for conducting gas to said burner, a main valve controlling the flow of gas through said conduit means, electric motor means for positioning said main valve, a thermostat responsive to the temperature at a relatively warm level of the space for controlling the energization of said motor means, means in series with said main valve and between said main valve and said burner comprising a continuously open passage of limited size and a parallel passage having a valve therein, separate motor means for said last named valve, and means responsive to the temperature of the air returning to said furnace for controlling said last named motor means to control the amount of gas admitted to said burner when said main valve is open.

10. In a system for controlling the temperature of a space, a warm air furnace, a gas burner for heating the air passing through said furnace, duct means for delivering the heated air to said space and returning the cool air from said space to said furnace, conduit means for conducting gas to said burner, a main valve controlling the flow of gas through said conduit means, electric motor means for positioning said main valve, a thermostat responsive to the temperature at a relatively warm level of the space for controlling the energization of said motor means, means in series with said main valve and between said main valve and said burner comprising a continuously open passage of limited size and a parallel passage having a valve therein, separate motor means for said last named valve, and means responsive to the temperature of said cool air for controlling said last named motor means.

ARTHUR C. GRANT.
CLARENCE W. NESSELL.